United States Patent
Ovshinsky et al.

(10) Patent No.: US 6,537,700 B1
(45) Date of Patent: Mar. 25, 2003

(54) NICKEL POSITIVE ELECTRODE MATERIAL WITH MISCH METAL ADDITIVES

(75) Inventors: Stanford R. Ovshinsky, Bloomfield Hills, MI (US); Boyko Aladjov, Rochester Hills, MI (US); Srinivasan Venkatesan, Sourthfield, MI (US); Subhash K. Dhar, Bloomfield Hills, MI (US)

(73) Assignee: Ovonic Battery Company, Inc., Troy, MI (US)

( * ) Notice: Subject to any disclaimer, the term of this patent is extended or adjusted under 35 U.S.C. 154(b) by 0 days.

(21) Appl. No.: 09/707,550

(22) Filed: Nov. 7, 2000

Related U.S. Application Data

(62) Division of application No. 09/159,410, filed on Sep. 23, 1998, now Pat. No. 6,150,054.
(51) Int. Cl.$^7$ .................................................. H01M 4/32
(52) U.S. Cl. ..................................... 429/223; 252/521.2
(58) Field of Search ................................. 429/222, 223, 429/218.2; 423/594; 252/521.2

(56) References Cited

U.S. PATENT DOCUMENTS 6,235,428 B1 * 5/2001 Yano et al. .................. 429/163

FOREIGN PATENT DOCUMENTS

| JP | 08-115722 | * | 7/1996 |
| WO | WO-98/34290 | * | 6/1998 |

OTHER PUBLICATIONS

Merriam Webster's Collegiate Dictionary, Tenth Edition, Merriam–Webster, Incorporated: Massachusetts (1997), p. 743 (definition for misch metal) No month available.*

* cited by examiner

Primary Examiner—Patrick Ryan
Assistant Examiner—Susy Tsang-Foster
(74) Attorney, Agent, or Firm—Philip H. Schlazer; Marvin S. Siskind

(57) ABSTRACT

An active material mixture for use in a paste for fabricating positive electrodes, comprising a nickel hydroxide material, and an additive material comprising at least one material selected from the group consisting of a misch metal or a misch metal alloy. A nickel positive electrode and an alkaline electrochemical cell using this active material mixture.

8 Claims, No Drawings

NICKEL POSITIVE ELECTRODE MATERIAL WITH MISCH METAL ADDITIVES

RELATED APPLICATION INFORMATION

This application is a divisional application of U.S. patent application Ser. No. 09/159,410, now U.S. Pat. No. 6,150,054, filed on Sep. 23, 1998.

FIELD OF THE INVENTION

The present invention relates to an improved positive electrode material, to a nickel positive electrode using the electrode material, and to an alkaline electrochemical cell using the nickel positive electrode.

BACKGROUND OF THE INVENTION

The recent trend for portable apparatus has increased the requirement for high energy density rechargeable batteries. High energy density is also important for batteries used for electric vehicles.

Nickel hydroxide has been used for years as an active material for the positive electrode of alkaline electrochemical cells. Examples of such nickel-based alkaline cells include nickel cadmium (Ni—Cd) cells and nickel-metal hydride (Ni—MH) cells. The energy density of such nickel-based electrochemical cells may be increased by closely packing the nickel hydroxide active material into an electrically conductive substrate such as a porous foam. However, there are limitations on the amount of pressure used to increase packing density. Application of too much pressure causes expansion of electrode plates and compresses the separators placed between the positive and negative electrodes. The compression of the separators presses out the electrolyte solution and deteriorates the discharge characteristics.

In a nickel cadmium cell, cadmium metal is the active material in the negative electrode. Ni—Cd cells use a positive electrode of nickel hydroxide material. The negative and positive electrodes are spaced apart in the alkaline electrolyte. The charge/discharge reactions at the negative electrode are controlled by the following reaction:

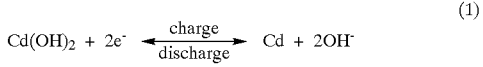
(1)

During charge, electrons are supplied to the negative electrode, whereby $Cd(OH)_2$ is reduced to Cd. During discharge, Cd is oxidized to $Cd(OH)_2$ and electrons are released.

The reactions that take place at the positive electrode of a Ni—Cd cell are also reversible. For example, the reactions at a nickel hydroxide positive electrode in a nickel cadmium cell are:

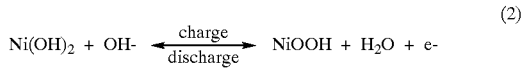
(2)

At the positive electrode, $Ni(OH)_2$ is oxidized to NiOOH during the charge operation. During discharge, the NiOOH is reduced to $Ni(OH)_2$.

In general, nickel-metal hydride (Ni—MH) cells utilize a negative electrode comprising a metal nydride active material that is capable of the reversible electrochemical storage of hydrogen. Examples of metal hydride materials are provided in U.S. Pat. Nos. 4,551,400, 4,728,586, and 5,536,591 the disclosures of which are incorporated by reference herein. The positive electrode of the nickel-metal hydride cell comprise a nickel hydroxide active material. The negative and positive electrodes are spaced apart in the alkaline electrolyte.

Upon application of an electrical potential across a Ni—MH cell, the Ni—MH material of the negative electrode is charged by the electrochemical absorption of hydrogen and the electrochemical generation of hydroxyl ions:

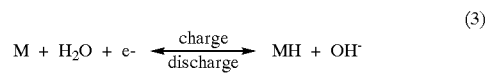
(3)

The negative electrode reactions are reversible. Upon discharge, the stored hydrogen is released to form a water molecule and evolve an electron.

The reactions that take place at the nickel hydroxide positive electrode of a Ni—MH cell are the same as for a Ni—Cd cell and are provided by reaction (2).

Hence, the charging process for a nickel hydroxide positive electrode in an alkaline storage battery is governed by the following reaction:

(4)

The charging efficiency of the positive electrode and the utilization of the positive electrode material is affected by the oxygen evolution process which is controlled by the reaction:

(5)

During the charging process, a portion of the current applied to the battery for the purpose of charging, is instead consumed by the oxygen evolution reaction (5). The oxygen evolution of reaction (5) is not desirable and contributes to lower utilization rates upon charging. One reason both occur is that their electrochemical reaction potential values are very close. Anything that can be done to widen the gap between them (i.e., lowering the nickel reaction potential is reaction (4) or raising the reaction potential of the oxygen evolution reaction (5)) will contribute to higher utilization rates. It is noted that the reaction potential of the oxygen evolution reaction (5) is also referred to as the oxygen evolution potential.

Furthermore, the electrochemical reaction potential of reaction (5) is temperature dependent. At lower temperatures, oxygen evolution is low and the charging efficiency is high. However, at higher temperatures, the electrochemical reaction potential of reaction (5) decreases and the rate of the oxygen evolution reaction (5) increases so that the charging efficiency of the nickel hydroxide positive electrode drops. High temperatures at the positive electrodes may be due to the external environment at which the battery is operated. They may also be due to the heat generated within the battery by oxygen gas recombination at the negative electrodes.

One way to increase the reaction potential of equation (5) is by mixing certain additives with the nickel hydroxide active material when forming the positive electrode paste. U.S. Pat. Nos. 5,466,543, 5,451,475 and 5,571,636 disclose certain additives which improve the rate of utilization of the nickel hydroxide in a wide temperature range. The present invention discloses new additives which improve the high temperature utilization of nickel-based positive electrode materials.

SUMMARY OF THE INVENTION

An objective of the present invention is a positive electrode active material mixture, a nickel positive electrode, and an alkaline electrochemical cell having high-temperature capacity and utilization.

This objective is further satisfied by an active material mixture for use in a paste for fabricating positive electrodes, comprising: a nickel hydroxide material; and an additive material comprising at least one material selected from the group consisting of a rare earth mineral, and a rare earth concentrate.

This objective is further satisfied by an active material mixture for use in a paste for fabricating positive electrodes, comprising: a nickel hydroxide material; and an additive material comprising at least one material selected from the group consisting of a misch metal, and a misch metal alloy.

This objective is further satisfied by a nickel positive electrode for an alkaline electrochemical cell, comprising: an active material mixture comprising: a nickel hydroxide material; and an additive material comprising at least one material selected from the group consisting of a rare earth mineral, and a rare earth concentrate.

This objective is further satisfied by a nickel positive electrode for an alkaline electrochemical cell, comprising: an active material mixture comprising: a nickel hydroxide material; and an additive material comprising a material selected from the group consisting of a misch metal, and a misch metal alloy.

This objective is further satisfied an alkaline electrochemical cell, comprising: at least nickel positive electrode; at least one negative electrode; and electrolyte; where the positive electrode comprises an active material mixture comprising: a nickel hydroxide material; and an additive material comprising at least one element selected from the group consisting of a rare earth mineral, and a rare earth concentrate.

This objective is further satisfied by an alkaline electrochemical cell, comprising: at least nickel positive electrode; at least one negative electrode; and electrolyte; where the positive electrode comprises an active material mixture comprising: a nickel hydroxide material; and an additive material comprising at least one element selected from the group consisting of a misch metal, and a misch metal alloy.

DETAILED DESCRIPTION OF THE INVENTION

Disclosed herein is a positive electrode active material mixture for use in a paste for fabricating positive electrodes. The active material mixture comprises a nickel hydroxide material and an additive material.

In one embodiment, the additive material comprises at least one material selected from the group consisting of a rare earth mineral, and a rare earth concentrate. In general, a rare earth mineral is a mineral comprising at least one rare earth element. As used herein, the term "rare earth element" refers to the elements Y, La, Ce, Pr, Nd, Pm, Sm, Eu, Gd, Tb, Dy, Ho, Er, Tm, Tb, Yb, and Lu. As used herein, the term "lanthanides" refers to the elements La, Ce, Pr, Nd, Pm, Sm, Eu, Gd, Tb, Dy, Ho, Er, Tm, Tb, Yb, and Lu. (That is, the term "lanthanides" includes all of the elements listed under "rare earth elements" except for Y (yttrium)).

In general, any rare earth mineral may be used as the additive material. Preferably, the rare earth mineral is selected from the group consisting of bastnasite, monazite, loparite, xenotime, apatite, eudialyte, and brannerite. More preferably, the rare earth mineral is bastnasite, or monazite. Other examples are provided in the book *Rare Earth Minerals—Chemistry, Origin and Ore Deposits*, Chapman and Hall, 1996. The rare earth mineral may be heat treated before being mixed with the nickel hydroxide material. Mixtures of rare earth minerals may also be used.

The additive material may comprise a rare earth concentrate. A rare earth concentrate is a material derived directly from processes operating on the starting rare earth mineral before any separation into either individual rare earth elements or individual rare earth compounds takes place. Typically, the rare earth mineral is treated by conventional mineral processing technology, such as comminution followed by froth flotation, to produce the rare earth concentrate. Preferably, the rare earth concentrate is selected from the group consisting of bastnasite concentrate, monazite concentrate, loparite concentrate, xenotime concentrate, apatite concentrate, eudialyte concentrate, and brannerite concentrate. More preferably, the rare earth concentrate is bastnasite concentrate, or monazite concentrate. Mixtures of rare earth concentrates may also be used.

Many rare earth concentrates may be split into other concentrates which are rich in certain of the rare earth elements. For example, bastnasite concentrate may be split into two other concentrates. One is called lanthanum concentrate and the other is called cerium concentrate. The lanthanum concentrate contains only a small percentage of cerium while the cerium concentrate is cerium rich. It is noted that concentrates derived from other concentrates are included within the concept of "rare earth concentrate" are used herein and are also within the scope of this invention.

It is noted that U.S. Pat. Nos. 5,571,636 and 5,451,475 disclose the addition of yttrium, or a powdery compound of yttrium such as yttrium oxide or yttrium carbonate to the nickel hydroxide material. Also, U.S. Pat. No. 5,466,543 discloses a nickel hydroxide material containing at least one compound of yttrium. It is noted that rare earth minerals and rare earth concentrates are not pure rare earth elements or pure rare earth compounds, and that the '475, '636 and '543 Patents fail to either teach or suggest that either a rare earth mineral or a rare earth concentrate can be added to the active nickel hydroxide material to improve the high temperature utilization.

In another embodiment of the present invention, the additive material is at least one material selected from the group consisting of misch metal, and misch metal alloy. As used herein misch metal may be denoted as "Mm". A "misch metal" is defined herein as a mixed rare earth metal. It may be prepared by electrolysis of fused rare earth chlorides. Misch metals may comprise between about 94 to 99% rare earth metals plus traces of aluminum, calcium, carbon, silicon, and iron. An example of a misch metal composition is between about 50 to 60% cerium, between about 25 to 30% lanthanum, between about 15 to 17% neodymium, and between about 4 to 6% praseodymium.

The misch metal alloy may comprise nickel. An example of a misch metal alloy is a nickel-based misch metal alloy such as $MmNi_x$, where x is between about 4.5 and about 5.5.

Preferably, the additive material is between about 1% and 10% by weight of the positive electrode active material mixture. More preferably, the additive material is between about 2% and 6% by weight of the positive electrode active material mixture. Most preferably, the additive material is about 3% by weight of the positive electrode active material mixture.

The nickel hydroxide material may be any nickel hydroxide material known in the art. It is within the spirit and intent of this invention that any and all kinds of nickel hydroxide materials may be used. Examples of possible nickel hydroxide materials are provided in U.S. Pat. Nos. 5,348,822 and 5,637,423, the contents of which are incorporated by reference herein.

Also disclosed herein is a nickel positive electrode for use in an alkaline electrochemical cell. The nickel positive electrode comprises the active material described above. The positive electrode further comprises an electrically conductive substrate used to support the active material. The electrically conductive substrate may be any substrate, known in the art, capable of holding the positive electrode material. It is within the spirit and intent of this invention that any and all kinds of electrically conductive substrates may be used. Examples of substrates include foam, perforated metal, expanded metal, screen, and matte. Preferably the substrate is a metal foam. Preferably, the metal comprises nickel or a nickel alloy.

The additive materials are mixed with the nickel hydroxide material to form the active material mixture. Preferably, a binder, such as polyvinyl alcohol, is also added to the active material mixture to form a paste. The paste is affixed to an electrically conductive substrate to form the electrode.

It is noted that the additive material serves as a poison for the oxygen evolution reaction (5). As a result, a charge reaction of nickel hydroxide to nickel oxyhydroxide expressed as reaction formula (4) sufficiently proceeds to improve the utilization of the nickel positive electrode in the high-temperature atmosphere.

Also disclosed herein is an alkaline electrochemical cell. The electrochemical cell comprises at least one nickel positive electrode, at least one negative electrode, and electrolyte. The positive electrode is the positive electrode described above comprising the active material mixture of the present invention. The negative electrode may comprise a metal hydride active material. Alternately, the negative electrode may comprise a cadmium active material.

EXAMPLE

A "standard" positive electrode paste was formed from about 88.6% active nickel hydroxide material, about 5% cobalt, about 6% cobalt oxide, and about 0.4% polyvinyl alcohol binder. The paste was affixed to a nickel foam substrate to form a "standard" positive electrode.

Three additional positive electrode pastes were formed by replacing about 3% by weight of the nickel hydroxide material with the additives (1) bastnasite mineral, (2) bastnasite concentrate, and (3) MmNi$_5$. The pastes were applied to nickel foam substrate to form (1) bastnasite mineral, (2) bastnasite concentrate, and (3) MmNi$_5$ positive electrodes.

The standard positive electrode as well as the three additional electrodes made from the new active materials were all tested using the tri-electrode test technique. A small tri-electrode cell for testing electrodes was designed. The cell was fabricated by positioning a positive electrode between two negatives in the presence of excess electrolyte. The three electrode system was held in place by two plexiglass plates. The negative electrode used for the test was a nickel-metal hydride electrode. After initial formation, charges were done at C/10 to 120% charge. The discharges are done at C/10 until cutoff voltage of 0.9 volts. The capacity of each electrode was measured at 22° C. and at 45° C. The percentage decrease in capacity at 45° C. compared to that at 22° C. is shown in the Table.

TABLE

| Additive | % decrease in capacity |
| --- | --- |
| standard | 16.0 |
| bastnasite ore | 7.5 |
| bastnasite mineral | 7.5 |
| MmNi$_5$ | 10.2 |

It is to be understood that the disclosure set forth herein is presented in the form of detailed embodiments described for the purpose of making a full and complete disclosure of the present invention, and that such details are not to be interpreted as limiting the true scope of this invention as set forth and defined in the appended claims.

We claim:

1. An active material mixture for an electrode of an electrochemical cell, comprising:

a nickel hydroxide material; and a misch metal alloy comprising nickel.

2. The active material of claim 1, wherein said misch metal alloy is MmNi$_x$, where x is between about 4.5 and about 5.5.

3. An electrode for an alkaline electrochemical cell, comprising:

an active material mixture comprising:

a nickel hydroxide Material, and a misch metal alloy comprising nickel.

4. The electrode of claim 3, wherein said misch metal alloy is MmNi$_x$, where x is between about 4.5 and about 5.5.

5. An alkaline electrochemical cell, comprising:

at least one positive electrode;

at least one negative electrode; and electrolyte, where said positive electrode comprises an active material mixture comprising:

a nickel hydroxide material, and a misch metal alloy comprising nickel.

6. The electrochemical call of claim 5, wherein said misch metal alloy is MmNi$_x$, where x is between about 4.5 and about 5.5.

7. The electrochemical cell of claim 5, wherein said negative electrode comprises a metal hydride active material.

8. The electrochemical cell of claim 5, wherein said negative electrode comprises a cadmium active material.

* * * * *